July 21, 1936. R. GAHL 2,048,111
APPARATUS AND PROCESS FOR EFFECTING CHANGES IN DEGREE OF OXIDATION
OF FINELY DIVIDED MAGNETIC METALS AND METAL COMPOUNDS
Filed April 18, 1933
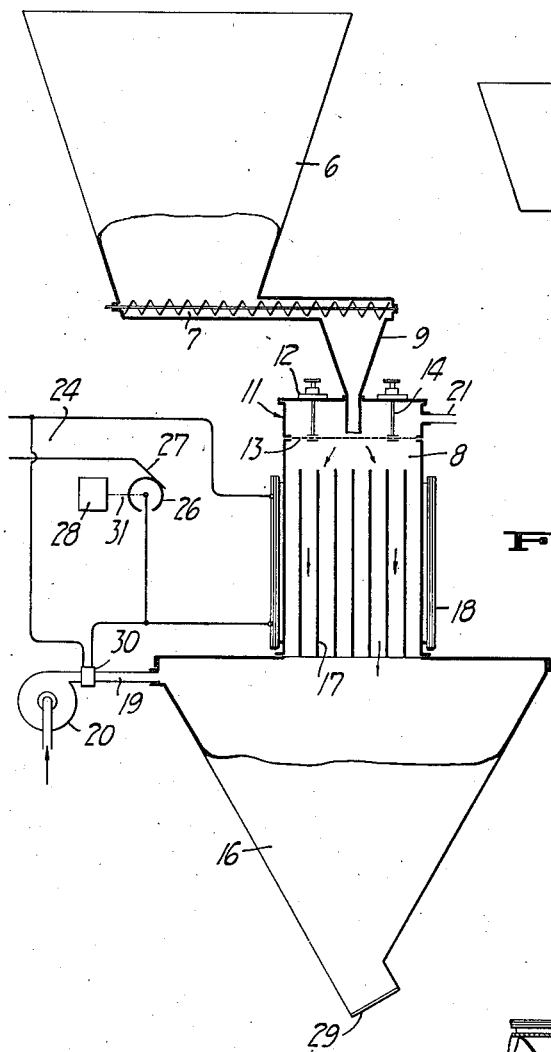
INVENTOR.
Rudolf Gahl
BY Robert H. Eckhoff
ATTORNEY.

Patented July 21, 1936

2,048,111

UNITED STATES PATENT OFFICE 2,048,111

APPARATUS AND PROCESS FOR EFFECTING CHANGES IN DEGREE OF OXIDATION OF FINELY DIVIDED MAGNETIC METALS AND METAL COMPOUNDS

Rudolf Gahl, Berkeley, Calif.

Application April 18, 1933, Serial No. 666,686

16 Claims. (Cl. 75—91)

The apparatus and process is particularly meant for the low temperature reduction of magnetite $Fe_3O_4$, (the magnetic oxide of iron), natural or artificial, to metallic iron and for the reverse reaction namely the oxidation of metallic iron to magnetite but both apparatus and process may be used for the reduction or oxidation of any magnetic elements or compounds, provided that the reaction in question can be carried out at a low temperature. When I say low temperature I mean that the temperature required for carrying out the reaction should not exceed the melting temperature of the reacting solid substances. It will be clear therefore that for instance among the reduction reactions the blast furnace reaction is outside the scope of my invention which distinctly applies only to reactions in which the reacting solids are in an essentially unfused condition. It hardly needs mentioning that when I speak about magnetic substances I do not mean to infer that the particles of such substances are necessarily magnets but only that they are magnetizable by a magnetic field.

The use of low temperatures for carrying out reactions of this character is not only desirable, because it facilitates the design of apparatus and effects economies in operation but also because it results in the production of materials that are particularly active in a chemical sense as for instance the so-called pyrophoric iron, since the slightest amount of fusion or sintering interferes with the chemical activity of the material produced. When such low temperatures are used the reactions are necessarily slower than they would be at higher temperatures, and considerations for the handling of a comparatively large tonnage in a given space become important. It is believed that my invention makes possible forms of apparatus which excel in that respect as they also do in simplicity. For instance it is possible to build such apparatus so that it does not contain any moving mechanical parts with the exception of electrical control apparatus.

It will be inferred from what has been said that the relatively slow reaction rate constitutes one of the limitations connected with such low-temperature reactions and that everything that tends to promote the quickness of the reaction as for instance an intimate contact between the reacting solid particles and the fluid reducing or oxidizing agent is of decided advantage for the technical success of the process. As will be further explained below I accomplish this by subjecting the finely divided solid magnetic material to the action of a magnetic field in certain ways further to be described. This has the effect that the particles arrange themselves chainlike along the lines of force thus allowing free access of the gaseous or liquid agents and an intimate contact between solids and fluids. The necessity of using a magnetic field when oxidation-reduction reactions are carried out according to my process rules out the treatment of finely divided solid substances that are non-magnetic, although with certain forms of my apparatus it is possible to treat mixtures consisting of separate grains of magnetic and non-magnetic substances provided that the percentage of the latter is not too large. If the individual solid particles treated consist of both magnetic and non-magnetic material, it is of course possible to treat matter of the type by my process provided that the magnetic properties of the individual particles are not unduly weakened by the presence of the non-magnetic material.

While the material treated in my apparatus and by my process should be more or less magnetic, it is not a necessity, at least not with certain forms of my apparatus, that the solid reaction product should also be magnetic.

It should not be understood that the use of my apparatus and process is limited to the treatment of iron, alloys of iron and compounds or iron, because elementary metals, alloys and compounds are known that are magnetic and yet contain no iron whatever. Among the elementary metals, nickel and cobalt fall into this group, among the alloys for instance certain alloys of manganese with other metals that are unmagnetic in their elementary form. Such substances are well suited for treatment by my process and in my apparatus.

I am aware of the fact that substances that are magnetic at ordinary temperatures lose their magnetism when heated sufficiently high. Thus is is stated that magnetite loses all of its magnetic susceptibility when heated close to 600 degrees C., while the corresponding temperature for iron is somewhat higher. It follows therefore that so far as these two substances are concerned the application of my apparatus and process is limited to a range of temperatures considerably below those mentioned. On the other hand the temperature should not be any lower than necessary in order to make use of magnetic forces, because the reaction velocity would otherwise be reduced too much. For this reason I am using temperatures in the neighborhood of 500 degrees C. for the reduction of magnetite to metallic iron. This temperature is assumed to have been utilized in the specific description of apparatus and process to be given below.

It goes without saying that inasmuch as changes in the degree of oxidation of solid substances are to be effected by my apparatus and process, the solid substances must be brought into contact with an active chemical agent and necessarily the latter must be fluid, if proper contact is to be made. In the case already mentioned namely the oxidation of metallic iron to magnetite and the reduction of magnetite to metallic iron, air, carbon dioxide or steam may for instance be used, if the oxygen content of the iron is to be increased, hydrogen, carbon monoxide or a suitable hydrocarbon, if it is to be decreased. However so far as the actual process and apparatus are concerned the same procedure and equipment may be used for either reaction and a description of the reduction process, say by means of carbon monoxide gas, will also fit the oxidation process, if e. g. the term iron is substituted for the term magnetite and steam for carbon monoxide. For that reason in the description of process and apparatus to be given below the reaction will be described in detail only as applied to a reduction process carried out on finely ground magnetite by means of carbon monoxide gas.

In using the term finely divided I mean to indicate that metal compounds treated according to my invention may be much finer than the ore fed to blast furnaces, this being the case because my invention is not subject to the conditions which limit the size of the blast furnace feed namely that with packed ore, in the blast furnace, proper air circulation can be maintained only with coarse ore. On account of the action of effectively applied magnetic forces I am able to treat material in my apparatus and by my process which is much finer and may even have the fineness of a powder.

Regarding the technical significance of the products derived from the principal reactions covered by this application I may say that finely divided iron is needed as a source for the production of steel in localities where coke is expensive, as a precipitant of certain metals such as copper from metal bearing solutions and for hydrogenation or the production of pure hydrogen by reaction with steam or superheated water. When the application is to hydrogenation, the metallic iron takes up oxygen, forming magnetite, in other words the degree of oxidation is raised, which means that a reaction takes place which may be carried out in conformity with this specification, but while in the reduction reaction the production of the finely divided metal is the object, the commercially valuable feature in the oppposite reaction is the production of hydrogen or the transfer of hydrogen to a substance that is to be hydrogenated such as an unsaturated oil.

The construction of various forms of my apparatus will be evident from the drawing attached to this specification, and will now be described in connection with the reduction process which finely ground magnetic iron oxide undergoes when passing through the apparatus.

Figure 1 is a diagrammatic representation, partly in section, showing a suitable apparatus in which gravity is utilized to transport the finely divided solid material through the reaction zone.

Figure 2 is another diagrammatic view illustrating the form of apparatus in which the current of the reacting fluid is utilized as the means for effecting transport of the material through the reaction zone.

Figure 3 is a section taken through a portion of the reaction chamber to illustrate the construction thereof.

Figure 4 is a plan view partly in section illustrating another form of reaction zone in which a mechanical conveyor is utilized as the conveying means in the reaction zone.

Figure 5 is another view illustrating the use of mechanical conveyors for carrying the material through the reaction zone.

In the aforementioned drawing, the reaction fluid is assumed to be a gas. The essential parts of the apparatus will however also serve for liquid reactants although in this instance the auxiliary apparatus will require some modification which will be apparent to those skilled in the art.

Referring to Figure 1, finely ground material from bin 6 is carried by a suitable conveyor 7 to enter the shaft or reaction zone 8, ordinarily of rectangular cross section, through a pipe or chute 9. The material in bin 6 forms a seal preventing the gases contained in 8 from escaping. On the passage from chute 9 to zone 8, the material has to go through the distributor 11 which distributes the material fairly evenly over the whole horizontal cross-section of zone 8. As shown in the drawing, the distribution is provided by the electrical mechanism indicated by 12 and transmitted to screen 13 by the rods 14. The perforations in screen 13 are of such a size that ultimately all the material dropping on it will pass through, although the screen delays its passage. The design of the distributor is not of vital importance for the apparatus outlined in this specification and various forms can be used.

The magnetic iron oxide accumulates in zone 8, being prevented from dropping into the bin 16 by the magnetic field produced by the electromagnets 18 through the coils of which an electric current passes. The shaft 8 is preferably subdivided by vertical walls 17 made of iron or other magnetc material. They strengthen the magnetic field and facilitate the suspension of the magnetic material in zone 8. If they were left out, the intensity of the magnetic field and the electric current generating it would have to be very much increased to effect the retention of the material treated in the apparatus. The partitions 17 do not have to consist of solid sheets of metal but may be perforated or even built up of wire screen.

Magnetic forces are set up by the magnets 18 and ordinarily prevent any magnetic feed or reduced iron particles from leaving the magnetic field either through the bottom or the top of the shaft 8. It may be stated that the non-magnetic ferrous oxide is not likely to form during the reduction process since it is unstable in the range of temperatures for which this process is mainly intended. The means for producing the magnetic field are indicated in a diagrammatic way only, and that I do not intend to confine myself to any specific assumption about the means by which the magnetic field is produced.

The reducing gas is supplied by fan 20 from a source (not shown). This gas is assumed to enter at the point 19 (shown near the top of bin 16) and to leave at the top of shaft 8 at 21 or it may enter at 21 and leave at 19. The latter arrangement is in fact preferable in some cases because dust that is carried by the stream of gas is retained by the magnetic plates 17 before leaving through 19. However a gas stream countercurrent to the movement of solids has other advantages that will be explained later and for that reason in what follows the assumption has been made that the gas current enters at 19 and leaves at 21. As mentioned before, the reducing gas is assumed to be carbon monoxide in this specific description of the process. It may be mentioned here however that the process is not confined to the use of that gas but that the gas may be of any suitable kind. It may for instance also be hydrogen or a hydrocarbon or a mixture of gases but the apparatus as illustrated will only serve if the reaction between the oxide and the reducing gas is exothermic. The oxidizing reaction of steam on finely divided iron is of this type as well as the reducing reaction of carbon monoxide on magnetite. If the reaction is not exothermic, suitable means for heating the reacting materials will have to be provided.

It will be evident from what has been said that, provided the reduction had been properly started by bringing the reacting materials to the temperature required for the purpose, the reaction will maintain itself thermally, as it has been assumed as being sufficiently exothermic to do that. The iron oxide material contained in shaft 8 will therefore be gradually reduced to the metallic condition. It should be noted that both the reducing gas entering at 19 and the magnetic material entering at 9 are assumed to be preheated to a temperature close to the temperature at which the reduction is to be carried out of say 500° C. The pre-heating may be accomplished by imparting heat from outside sources or by producing the reducing gas by an exothermic reaction of the type discussed in the copending Application 652,195, filed January 12, 1933.

At the rate at which reduction takes place, the solid material is allowed to slide downward which is acomplished by momentarily interrupting the electric current producing the magnetic field and possibly the gas current, the latter in order to prevent dust from being carried away, while the plates do not exercise any attractive force. The interruptions of the electric current may be accomplished by certain automatic means but since their construction is not essential for the purposes of this application they are not described in detail except to point out that lead in wires 24 carry current to magnets 18. An interrupter 26 is included in the circuit in the form of a split ring engaged by contact 27. The ring is rotated by motor 28 so that the momentary interruption is substantially regular. It will suffice to say that so far as the control of the magnetic field is concerned, proper choice of the electric current, that is for instance the use of pulsating or otherwise fluctuating current will take care of it. Similarly a pulsating current of reducing gas may be employed and the feed of solid material may also be intermittent, fan 20 and conveyor 7 enabling this.

Although the fluctuating magnetic forces have been assumed so far as having been produced by fluctuating electric current in connection with electro-magnets, it should be understood that a fluctuating field can also be obtained by permanent magnets or electromagnets excited by ordinary direct current if such magnets are periodically moved towards and away from the reduction chamber or moved alongside. In the former case the magnetic particles will drop by gravity due to the weakened field, in the other case they will follow the magnets on their way alongside the reduction chamber. Although in these cases the magnetic field does not change in regard to the moving magnets it does so in regard to any fixed point in the reaction zone.

If the adjustments are properly made, that is, if solid material and reducing gas are fed at the correct rate to effect reduction and if both electric and gas current are so chosen and regulated that the proper downward motion of the charge takes place, relatively cool iron accumulates in the bin 16 from where it may be drawn off intermittently through the gate 29, it being of course assumed that proper precautions are being taken to prevent reoxidation of the iron or leakage of gas through the gate. It will be evident from what has been said before, that the utilization of magnets for suspending the material that is to be reduced results in an arrangement of the particles that precludes any danger from packing or channeling of the charge, which if it did take place would naturally interfere with a uniform progress of the reduction. The existence of the gas current as well as the pulsations of the electric and of the gas current, if they are employed, make this danger still more remote and by causing a certain amount of agitation assist materially in improving the contact between the gas and the solid particles. As has been mentioned before, the magnetic forces also play a very important part in preventing fine solid particles from being carried away by the gas current. As this effect is limited to the periods of magnetization, it is necessary if it is to be utilized to the fullest extent, to adjust the electric and gas currents to each other in such a way that their periods of interruption coincide so that particle flow does not coincide with gas flow. This can be secured, for example by including electric operated valve 30 in the circuit with split ring 26, the valve being open only when the magnets 18 are effectively energized to hold magnetizable material.

It will be understood, on the strength of what has been said, that while the apparatus described is primarily meant to serve for the reduction of magnetic iron oxide, non-magnetic oxides and other substances will be carried along by the magnetic iron oxide unless their proportion is excessive. Thus if the admixed compounds are such that they are reducible at the temperatures maintained in the apparatus, both iron and the other metal will simultaneously be reduced.

While the chamber in which the metal compounds are reduced to metal is indicated in the form of a vertical shaft in Figure 1, it has not necessarily to be arranged vertically but can also be constructed in the form of a horizontal or inclined flue 36 providing the reaction zone. Types of horizontal flues are indicated in Figures 2, 3, 4 and 5. In the case of a horizontal flue, gravity can not be utilized for the transportation of the material through the flue and other means have to be relied on for that purpose. Figure 2 is based on the assumption that the current of reducing gas from fan 20 is strong enough to keep the magnetic particles in motion except when magnetic forces are exercised in which case the solid particles adhere to the walls 17 of the individual channels or bridge across them. 18 again represents electromagnets, their action being (as in Figure 1) intensified by the partitions 17 of magnetizable material. The feed mechanism is of the same type as that shown in Figure 1.

Figure 4 represents the reaction zone of another apparatus of the type of Figure 2 in which mechanical means are utilized for the transport of the solid material. In this form the reaction chamber 36 is provided with a conveyor screw 37 for carrying the material therethrough. Magnets 18, either permanent or electromagnets, produce a magnetic field which causes the solid magnetic particles to adhere to the walls of the chamber 36. It should be noted that although a conveyor screw is utilized, the action is not the same as that of an ordinary screw conveyor, for while in the latter the material to be conveyed covers the bottom and part of the sides of the circumference, leaving the top free the action of the conveyor illustrated by Figure 4 is different inasmuch as due to the magnetic forces the solid material can cling to the whole periphery. The magnetic forces as pointed out in connection with the figures previously described produce a mechanical structure of the mass of solid grains that insures on one hand an intimate contact with the reducing gas and on the other hand prevents solid particles from being carried away by the gas current. This form of construction has the advantage over those previously described that a constant magnetic field is as suitable in connection with it as a fluctuating field, while the necessity of using moving mechanical parts is one of its weak points.

The horizontal cylindrical form of a reaction chamber may be worked out in a somewhat different form from that which is shown in Figure 4. In Figure 5 the lower portions of stationary cylinders 41 are furnished with magnets 18 and as a consequence the magnetic material propelled by the screws 42 is not lifted to the upper portion of the cylinders but remains in the bottom portions. As a consequence the upper portion of the cylinders is more or less useless and has been done away with and a number of these partial cylinders are shown as asembled into a battery of three. They are located in a reaction chamber 44 which is limited by the walls and roof indicated in Figure 5 by the lines 46 and 47 respectively.

The figures attached to this specification are meant to illustrate the basic principles underlying my invention only. They can be applied in various other ways which will be obvious to those skilled in the art.

I claim:

1. An apparatus for effecting changes in degree of oxidation of finely divided magnetic metals and metal compounds containing a conduit, partitions of magnetic material located in such conduit, magnets located near the walls of such conduit so as to act on the finely divided material passing through, means for introducing the finely divided magnetic material into such conduit and means for concomitantly introducing a current of fluid into such conduit.

2. An apparatus for effecting changes in degree of oxidation of finely divided magnetic metals and metal compounds containing a conduit, longitudinally arranged partitions of magnetic material located in such conduit, magnets located near the walls of such conduit so as to act on the finely divided material passing through, means for introducing the finely divided magnetic material into such conduit and means for concomitantly introducing a current of fluid into such conduit.

3. An apparatus for effecting changes in degree of oxidation of finely divided magnetic metals and metal compounds containing a conduit, longitudinally arranged partitions located in such conduit substantially at right angles to the lines of force of magnets located near the walls of such conduit so as to act on the finely divided material passing through, means for introducing the finely divided magnetic material into such conduit and means for concomitantly introducing a current of fluid into such conduit.

4. An apparatus for effecting changes in degree of oxidation of finely divided magnetic metals and metal compounds embracing a conduit containing conveying apparatus; said apparatus further embracing magnets, so as to act on the finely divided material while being handled by such conveying apparatus, means for introducing the finely divided magnetic material into said conduit and means for concomitantly introducing a current of fluid into such conduit.

5. An apparatus for effecting changes in degree of oxidation of finely divided magnetic metals and metal compounds embracing a conduit containing a screw conveyor; said apparatus further embracing magnets around the periphery of such conduit, so as to act on the finely divided material while being handled by such screw conveyor, means for introducing the finely divided magnetic material into said conduit and means for concomitantly introducing a current of fluid into such conduit.

6. An apparatus for effecting changes in degree of oxidation of finely divided magnetic metals and metal compounds embracing a conduit containing a rotary conveyor; said apparatus further embracing magnets around the lower portion of the periphery of such conduit so as to act on the finely divided material while being handled by such rotating conveyor, means for introducing the finely divided magnetic material into said conduit and means for concomitantly introducing a current of fluid into such conduit.

7. A process of treating a magnetic material with a gaseous reactant comprising establishing a flowing stream of said material and continuously subjecting said stream in an intermittent manner to a magnetic field sufficient in strength to stop substantially said flow while subjecting said material to said reactant.

8. A process for treating a magnetic material with a gaseous reactant comprising establishing a flowing stream of said reactant, establishing a flowing stream of said material in contact with said reactant stream, and continuously magnetizing said material in an intermittent manner to interrupt said flow.

9. A process for treating a magnetic material with a gaseous reactant comprising establishing a flowing stream of said reactant, continuously interrupting said reactant flow in an intermittent manner, establishing a flowing stream of said material in contact with said reactant stream, and continuously magnetizing in an intermittent manner said material to interrupt said flow.

10. A process for treating a magnetic material with a gaseous reactant comprising establishing a flowing stream of said reactant, continuously interrupting said reactant flow in an intermittent manner, establishing a flowing stream of said material in contact with said reactant stream, and continuously magnetizing in an intermittent manner said material to interrupt said flow, said interruption being successive so that said reactant flows only when said material flow is interrupted and vice versa.

11. A metallurgical apparatus comprising means for maintaining flow of a stream of a magnetic material, means for subjecting said material to reaction with a flowing reactant stream and means for continuously magnetizing said material in an intermittent manner to interrupt said flow of material.

12. A metallurgical apparatus comprising means for maintaining flow of a stream of a magnetic material, means for maintaining flow of a stream of a reactant in contact with said material and means for continuously magnetizing said material in an intermittent manner to interrupt said flow of material.

13. A metallurgical apparatus comprising means for maintaining flow of a stream of a magnetic material, means for maintaining flow of a stream of a reactant in contact with said material, means for continuously interrupting in an intermittent manner flow of said reactant and means for continuously magnetizing in an intermittent manner said material to interrupt said flow of material.

14. A metallurgical apparatus comprising means for maintaining flow of a stream of a magnetic material, means for maintaining flow of a stream of a reactant in contact with said material, means for continuously interrupting in an intermittent manner flow of said reactant and means for continuously magnetizing in an intermittent manner said material to interrupt said flow of material, said interrupting means effecting said interruptions only successively.

15. A process for effecting changes in degree of oxidation of finely divided magnetic metals and magnetic metal compounds which comprises subjecting the same to the action of magnetic forces for continuously arresting in an intermittent manner passage of the finely divided magnetic particles through a reaction zone, while subjecting said particles to the action of a current of fluid to effect the change in degree of oxidation.

16. In an apparatus of the class described, means for discharging a stream of a first material including a magnetizable component, means for receiving said discharge including a plurality of passages bordered by spaced magnetizable members, means for continuously magnetizing said members in an intermittent manner, and means for introducing a second material reacting with said first material into said passages.

RUDOLF GAHL.